W. P. BETTENDORF, DEC'D.
J. W. BETTENDORF, ADMINISTRATOR.
FEEDING TRUCK FOR HYDRAULIC PRESSES.
APPLICATION FILED JAN. 5, 1912.
1,030,768.
Patented June 25, 1912.
2 SHEETS—SHEET 1.
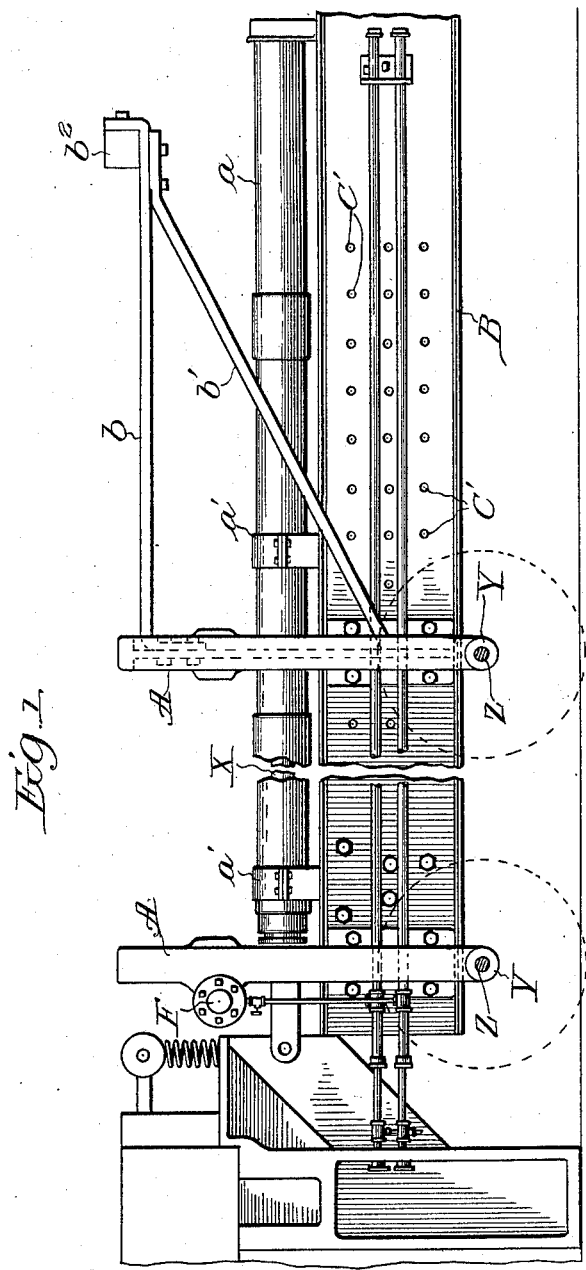
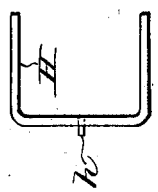
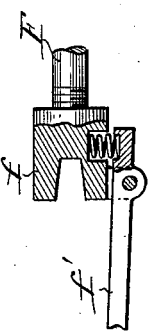

W. P. BETTENDORF, DEC'D.
J. W. BETTENDORF, ADMINISTRATOR.
FEEDING TRUCK FOR HYDRAULIC PRESSES.
APPLICATION FILED JAN. 5, 1912.
1,030,768.
Patented June 25, 1912.
2 SHEETS—SHEET 2.
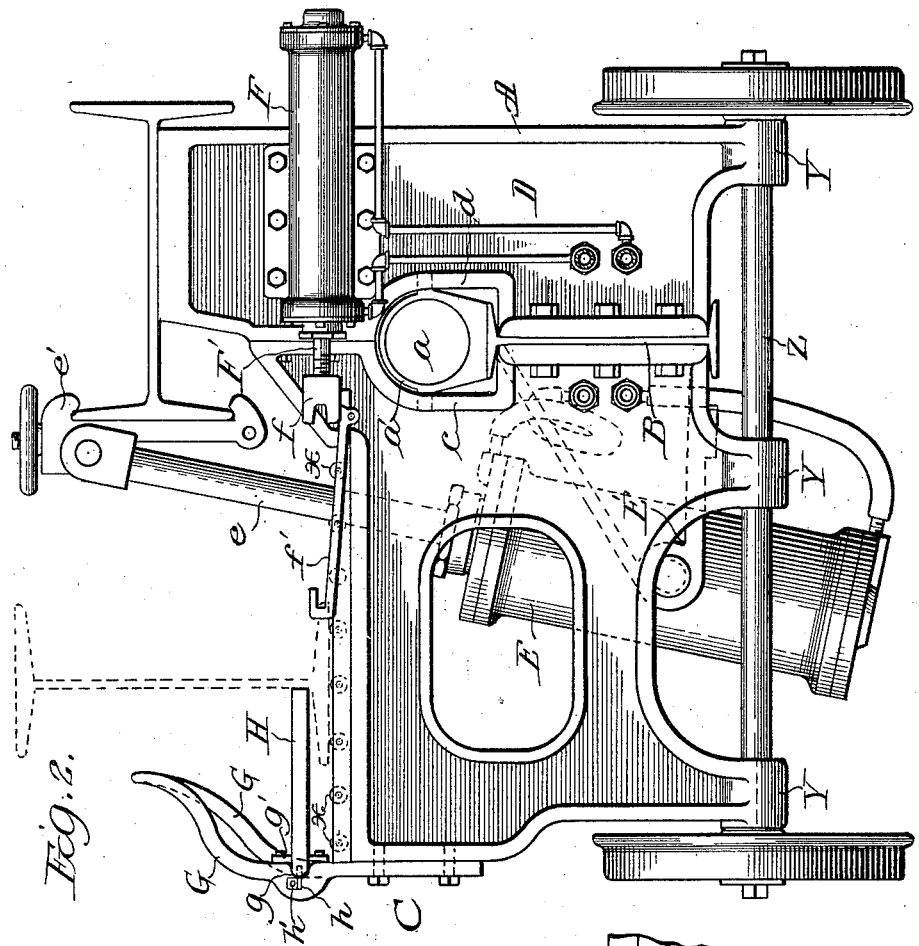

UNITED STATES PATENT OFFICE.

WILLIAM P. BETTENDORF, DECEASED, LATE OF BETTENDORF, IOWA, BY JOSEPH W. BETTENDORF, ADMINISTRATOR, OF BETTENDORF, IOWA.

FEEDING-TRUCK FOR HYDRAULIC PRESSES.

1,030,768.     Specification of Letters Patent.     Patented June 25, 1912.

Original application filed December 18, 1909, Serial No. 533,817. Divided and this application filed January 5, 1912. Serial No. 669,660.

*To all whom it may concern:*

Be it known that WILLIAM P. BETTENDORF, deceased, late a citizen of the United States, residing at Bettendorf, in the county of Scott and State of Iowa, did invent certain new and useful Improvements in Feeding-Trucks for Hydraulic Presses, of which the following is a full, clear, and exact description.

This invention relates to feed trucks or similar mechanism employed preferably to support one end of the work while it is being fed to a metal-working machine, and pertains more particularly to trucks for handling and feeding work to mechanism such as is shown and described in a pending application for Letters Patent of the United States, filed by said WILLIAM P. BETTENDORF, (deceased) on October 25th, 1909, Serial Number 524,467 (Case #164), and is a division of an application for Letters Patent of the United States for shifting device for press feeding mechanism patented January 30, 1912, No. 1,016,062 (Case #167) which latter application was divided out of said first-mentioned application.

As stated in the aforesaid applications, one of the chief objects of the invention is to avoid, as much as possible, the manual handling of the work, and thereby reduce the expenses of labor.

The principal object of this invention, however, is to provide a truck of novel construction for carrying the work, and possess shifting mechanism to suitably manipulate the same.

A further object is to provide suitable means whereby one of the bolsters of said truck may be adjusted longitudinally with relation to the reach thereof to accommodate different lengths or sizes of beams, and to provide suitable stop for the end opposite the press.

These objects I accomplish by the means and in the manner hereinafter fully described, and as more particularly pointed out in the claims, reference being had to the accompanying drawings forming a part hereof, in which—

Figure 1 is a side elevation of a truck of my invention showing the feeding or shifting mechanism applied thereto. Fig. 2 is an end elevation thereof, drawn to an enlarged scale. Fig. 3 is an enlarged detail view of one of the guards or stops used in connection therewith. Fig. 4 is a plan view of another of said stops. Fig. 5 is a detail view partially in section of the hooked arm of the shifter.

The truck of this invention comprises two or more transverse bolsters A, A, that are connected together by a suitable reach B (preferably an I-beam), which latter is secured in place in a suitable seat formed in said bolsters. These bolsters are, preferably, each made in two sections C, and D the former section, C, being much wider than the latter section, D, and both sections have their adjacent vertical edges flanged, and near the upper edge thereof are provided with substantially semi-circular recesses $c$ and $d$, respectively. The lower edges of said bolsters are provided with bearing bosses Y for the axles Z of the wheels on which the truck is moved. When said sections are connected together these recesses form a circular opening for seating the cylinder $a$ used in connection with the means for reciprocating the truck. Above this opening the flanged edges of said sections are bolted directly together while below the same the web of the ends of the I-beam reach B, connecting the forward with the rear bolster of the truck, is placed between the flanged edges of the sections, and secured thereto by means of the same bolts used to clamp the flanges of the lower portion of the meeting edges of said sections. As thus secured, the upper flanged edge of said I-beam reach enters the lower portion of the opening and the lower flanged edge thereof is below the lower edges of said bolster sections. The cylinder is secured to the upper flanges of the reach by means of straps $a'$, $a'$, or by any other suitable means, and has a suitable hollow piston or plunger X whose outer end is secured to the adjacent front edges of the press, and its operation is the same as that of the corresponding plunger fully described in the hereinbefore mentioned pending application and patent.

In order to accommodate the truck to the various lengths of beams to be operated upon, the rear bolster (that placed farthest from said press) can be made adjustable longitudinally upon the reach by punching several sets of bolt-holes C' in the vertical web of the latter, through which the bolts are passed according to the length of reach desired between the bolsters. The bolster sections are irregular in shape,—that is, the sections on one side of reach B are narrower than the sections on the opposite side thereof, and the latter has its upper horizontal edge in a plane below the horizontal edge of the former, substantially as shown in the drawings.

Secured, preferably, to the adjustable bolster near its upper end is a horizontal arm $b$, that projects rearwardly therefrom in a plane parallel to the vertical plane of the reach, and has its rear end bent upward at right angles to itself. The outer or rear end of this arm is reinforced by an inclined brace-rod $b'$ placed below and secured between it and said adjustable bolster. This structure forms a suitable stop-frame for the adjacent outer end of the work and the laterally bent end of arm $b$ forms a seat in which a suitable stop or gage-block $b^2$ is secured.

The metal beam to be operated upon is usually placed first flat upon the upper horizontal upper edge of the higher bolster section, as shown in full lines in Fig. 2 of the drawings, in which position the web of the beam is adapted to be punched or displaced. After this has been done, it is often necessary to compress the ends or some other portion of said beam, and to do this said beam must be moved and turned laterally down onto the lower wider section of the bolsters by means of the "flipper" mechanism. This structure preferably comprises a suitable cylinder E pivotally mounted mediate its ends in triangular-shaped brackets E' secured to and projecting laterally from the vertical web of the I-beam reach, and provided with a suitable piston $e$. This piston $e$ is reciprocable in said cylinder and carries a set of gripping jaws $e'$ on its outer end that are adapted to grip the adjacent flange of the beam being operated upon. When the operating fluid is forced into the cylinder on one side of the head of the piston the latter is moved to the lowermost part of said cylinder and "flips" the beam to a vertical position. Means are carried by this outer bolster for moving the commercial form constituting the work transverse to the length of the truck. This comprises a small horizontal transversely disposed cylinder F, the piston F' of which is provided with a bifurcated head $f$ and carries a pivoted arm $f'$ having a hook-shaped outer end so as to engage lower flanges of the beam when in vertical position. By admitting the actuating fluid first on one side and then on the opposite side of the piston-head the piston is caused to reciprocate and the outer end engages the beam and moves it laterally as desired.

Suitable guards G, G, are provided on the outer edges of the bolster for preventing the accidental displacement of the beam therefrom, while suitable rollers $x$, $x$, are seated on the top edge of the wider bolster-section for assisting in the transverse movement of the beam. The upper ends of guards G extend above the plane of the top of the bolster-sections and are then curved or bent inwardly and upwardly in a compound curve, substantially as shown. One of these guards (preferably that opposite the shifting mechanism above mentioned) has an open bearing $g$ just above the plane of the upper edge of said bolster-section, in which a suitable U-shaped movable gage H is journaled and retained in place by a removable plate $g'$. Gage H has a lateral lug $h$ projecting from its journaled member adjacent its bearing, and, when said gage is moved into a horizontal position, with its parallel portions pointing toward the work, said lug is adapted to engage the underside of a bolt-head or lug $h'$ projecting laterally from the side edge of the guard and maintain the stop in said horizontal position. When the gage is turned so that its parallel portions will move upward and in an arc away from the work, said lugs will move out of engagement, and the gage will be allowed to fall into the position shown in dotted lines in Fig. 3, in which position it will be out of the way.

When the beam is flipped into a vertical position, it will depress the pivoted arm $f'$ and the flange of the beam will rest on the rollers $x$, $x$, seated on the top of each of the shorter bolster-sections. The actuating fluid is then admitted to the shifting cylinder F to force its piston outwardly and cause the bifurcated end thereof to engage the adjacent edge of the lower flange of the beam and push said beam laterally until its web is engaged by either the stop H or the guards G, whereupon the truck is made to carry said beam toward and into the press to be operated upon.

What I claim as new is:—

1. In a machine of the kind specified, a truck comprising a reach consisting of a rolled metal beam, and bolsters comprising two vertically disposed sections each provided with seats in their opposing edges in which said beam rests, and the bolster at one end of said beam being adjustable thereon.

2. In a machine of the kind specified, a truck consisting of a reach made of a rolled metal beam, supporting bolsters therefor each comprising two vertically disposed sections the upper surfaces of which are of an irregular shape, and one of which bolsters is adjustable on said reach, and a device carried by the fixed bolster for shifting the work laterally.

3. In a machine of the kind specified, a truck consisting of a reach, supporting bolsters therefor each comprising two vertically disposed sections the upper surfaces of which are of an irregular shape, and one of which bolsters is adjustable longitudinally on said reach, and a device carried by the fixed bolster for shifting the work transversely on its support.

4. In a machine of the kind specified, a truck consisting of a reach, supporting bolsters therefor each comprising two vertically disposed sections the upper surfaces of which are of an irregular shape, and one of which bolsters is adjustable longitudinally on said reach, a horizontally disposed transverse cylinder rigidly secured to the fixed bolster, and a piston reciprocable therein the outer end of which is adapted to engage the work and shift the same laterally on its support.

5. In a machine of the kind specified, a truck comprising a suitable reach, and bolsters therefor each comprising two vertically disposed sections the upper surfaces of which are of an irregular shape, in combination with a horizontally disposed transverse cylinder, a piston therefor for shifting the work laterally, and means carried thereby for engaging and moving the work laterally and on said bolsters, and a guard secured to the side of the truck opposite said cylinder.

6. In a machine of the kind specified, a truck comprising a suitable reach, and bolsters therefor each comprising two vertically disposed sections the upper surfaces of which are stepped to different planes, in combination with a horizontally disposed transverse cylinder, a piston therefor reciprocable in the horizontal plane of one of said stepped supporting surfaces for shifting the work laterally, and means carried thereby for engaging and moving the work bodily laterally on said bolsters, a guard secured to the side of the truck opposite said cylinder, and a gage pivotally connected to said guard.

7. In a machine of the kind specified, a truck comprising a suitable reach, and bolsters therefor, in combination with a horizontally disposed cylinder, a piston therefor for shifting the work laterally, means carried thereby for engaging and moving the work bodily laterally on said bolsters, a guard secured to the side of the truck opposite said cylinder, and a U-shaped gage pivotally secured in said guard and adapted to be swung into and out of position.

8. In a machine of the kind specified, a truck comprising a suitable reach, and bolsters therefor each comprising two vertically disposed sections the upper surfaces of which are stepped to different planes and one of which bolsters is adjustable longitudinally on said reach, in combination with a horizontally disposed cylinder, a piston therefor reciprocable in the horizontal plane of one of said stepped supporting surfaces, means carried thereby for engaging and moving the work bodily laterally on said bolsters, and a guard secured to the side of the truck opposite said cylinder.

9. In a machine of the kind specified, a truck comprising a suitable reach, bolsters therefor each comprising two vertically disposed sections the upper surfaces of which are stepped to different planes, and a vertically disposed cylinder and piston for turning the work, in combination with a horizontally disposed transverse cylinder, a piston therefor reciprocable in the horizontal plane of one of said stepped supporting surfaces, for shifting the work laterally, and means carried thereby for engaging and moving the work bodily laterally on said bolsters, and a guard secured to the side of the truck opposite said cylinder.

10. In a machine of the kind specified, a truck comprising a suitable reach, bolsters therefor each comprising two vertically disposed sections the upper surfaces of which are stepped to different planes and one of which is adjustable longitudinally on said reach, and a vertically disposed cylinder and piston for turning the work, in combination with a horizontally disposed transverse cylinder, a piston therefor reciprocable in the horizontal plane of one of said stepped supporting surfaces for shifting the work laterally, means carried thereby for engaging and moving the work bodily laterally on said bolsters, and a guard secured to the side of the truck opposite said cylinder.

Signed at Bettendorf, Scott county, Iowa, Dec. 29th, 1911.

JOSEPH W. BETTENDORF,
*Administrator of the estate of William P. Bettendorf, deceased.*

Witnesses:
A. B. FRENIER,
HENRY BELLINGHAUSEN.

---

Copies of this patent may be obtained for five cents each, by addressing the "Commissioner of Patents, Washington, D. C."